(12) United States Patent
Chao et al.

(10) Patent No.: US 8,885,009 B2
(45) Date of Patent: Nov. 11, 2014

(54) METHOD FOR SWITCHING VIDEO CALLS BETWEEN DEVICES

(75) Inventors: Kuang-Cheng Chao, New Taipei (TW); Ying-Wen Huang, New Taipei (TW)

(73) Assignee: AmTRAN Technology Co., Ltd, Jhonghe District, New Taipei (TW)

( * ) Notice: Subject to any disclaimer, the term of this patent is extended or adjusted under 35 U.S.C. 154(b) by 202 days.

(21) Appl. No.: 13/474,733

(22) Filed: May 18, 2012

(65) Prior Publication Data

US 2013/0141514 A1 Jun. 6, 2013

(30) Foreign Application Priority Data

Dec. 1, 2011 (TW) .............................. 100144197 A (51) Int. Cl.
*H04N 7/14* (2006.01)
(52) U.S. Cl.
USPC ....................................... 348/14.02; 455/417
(58) Field of Classification Search
USPC ........ 348/14.02, 14.01, 14.08; 455/417, 41.1, 455/41.2, 41.3
See application file for complete search history.

(56) References Cited

U.S. PATENT DOCUMENTS

| 7,542,066 B2* | 6/2009 | Ezumi et al. ................ 348/14.01 |
| 8,543,060 B2* | 9/2013 | Mutikainen et al. ......... 455/41.2 |
| 2006/0040692 A1* | 2/2006 | Anttila et al. ................. 455/519 |
| 2008/0024593 A1* | 1/2008 | Tsirinsky et al. .......... 348/14.08 |
| 2009/0284580 A1* | 11/2009 | Knaz ........................... 348/14.02 |
| 2012/0013703 A1* | 1/2012 | Maeng et al. ............. 348/14.02 |
| 2012/0092437 A1* | 4/2012 | Kim et al. .................. 348/14.02 |
| 2012/0289213 A1* | 11/2012 | Levien et al. ................ 455/417 |
| 2013/0109374 A1* | 5/2013 | Kwon ........................ 455/426.1 |
| 2013/0309996 A1* | 11/2013 | Siegel et al. ................. 455/405 |
| 2014/0004839 A1* | 1/2014 | Block et al. ................. 455/417 |
| 2014/0057614 A1* | 2/2014 | Bhow et al. ................. 455/417 |

FOREIGN PATENT DOCUMENTS

CN 101729432 A 6/2010

\* cited by examiner

*Primary Examiner* — Stella Woo
(74) *Attorney, Agent, or Firm* — Winston Hsu; Scott Margo (57) ABSTRACT

A method for switching a call with video or at least one image between a first communication device and a display device is disclosed. The method includes the first communication device determining whether the display device is within a predetermined distance from the first communication device; if the display device is within the predetermined distance from the first communication device, the first communication device obtaining functional information from the display device; the first communication device transmitting communication information corresponding to a second communication device to the display device; and the display device launching network communication software and making a first call to the second communication device according to the communication information.

20 Claims, 10 Drawing Sheets

FIG. 10

METHOD FOR SWITCHING VIDEO CALLS BETWEEN DEVICES

BACKGROUND OF THE INVENTION

1. Field of the Invention

The present invention relates to a method for switching video calls between devices, and more particularly, to a method for switching calls between a communication device and a display device.

2. Description of the Prior Art

As related technology keeps improving, functions of a communication device are getting more powerful. Current communication devices can be utilized for making phone calls, positioning with satellite, surfing the Internet, and making free Internet calls, etc. However, the screen of the communication device is generally small, such that when the users are making a video call on the communication device, especially when lots of users communicate with other participants in the video call, the users can not see the image of other participants clearly due to the small screen size of the communication device, which causes inconvenience for the users. If the user tries to hand over the video call from the communication device to a display device having a larger screen, the display device with a larger screen generally is not portable and may not have the video call function or Internet communication software as required. Thus, the user must find where a display device with the video call function is in advance, turn on the display device, launch the Internet communication software, input communication information of other call participants, and making a video call to other call participants in order to continue the previous video call on the communication device. The above handover process is very complicated, and thus the video call cannot be handed over between different devices rapidly, which is inconvenient.

SUMMARY OF THE INVENTION

The present invention provides a method for switching a call with video or at least one image between a first communication device and a display device. The method comprises the first communication device determining whether the display device is within a predetermined distance from the first communication device; if the display device is within the predetermined distance from the first communication device, the first communication device transmitting communication information corresponding to a second communication device to the display device; and the display device launching network communication software and making a first call to the second communication device according to the communication information.

The present invention further provides another method for switching a call with video or at least one image between a display device and a first communication device. The method comprises utilizing network communication software installed in a display device to make a first call to a second communication device; the display device determining whether the distance to the first communication device is more than a predetermined distance; if the distance to the first communication device is more than the predetermined distance, the display device transmitting communication information corresponding to the second communication device to the first communication device; the first communication device making a second call to the second communication device according to the communication information; and terminating the first call.

The present invention further provides a method, implemented in a display device having a wireless module and a processor, for automatically making calls, said method comprising receiving a first wireless signal transmitted from a first communication device, said first wireless signal requesting a response signal from the display device; generating a response wireless signal responding to the first wireless signal and transmitting the response wireless signal to the first communication device; receiving a second wireless signal from the first communication device, said second wireless signal requesting functional information of the display device; generating and transmitting a third wireless signal to the first communication device, said third wireless signal indicating functional information of the display device; and receiving communication information corresponding to a second communication device from the first communication device; and launching network communication software and transmitting a call request to the second communication device according to the communication information.

In contrast to the prior art, the method for switching video calls of the present invention can automatically switch a call to a display device with a larger screen size when a communication device receives an incoming call or establishes a call with another communication device. The method of the present invention also can automatically switch the call back to the communication device when the communication device moves apart from the display device, so as to simplify operation processes for the user and increase convenience during use.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
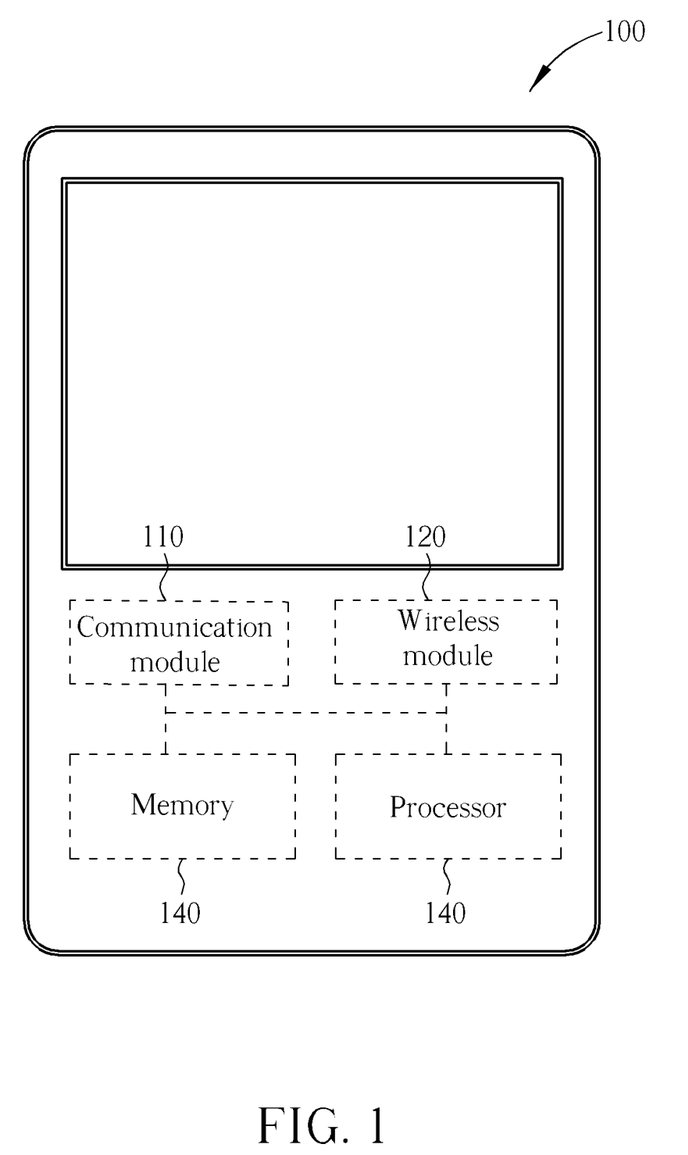
FIG. 1 is a diagram showing a communication device of the present invention.

Please refer to FIG. 1. FIG. 1 is a diagram showing a communication device 100 of the present invention. The communication device 100 of the present invention comprises a communication module 110, a wireless module 120, a memory 130, and a processor 140. The communication module 110 and the wireless module 120 can be any telecommunication module for making a call to other communication device via a mobile communication network (such as Global System for Mobile (GSM) communication network) or a wireless transmission module for receiving and transmitting wireless signals. The processor 140 is utilized to control operations of the communication device 100. The communication device 100 can be a smart phone, a tablet PC, or a remote control device with a communication function, etc.

Figure 2:
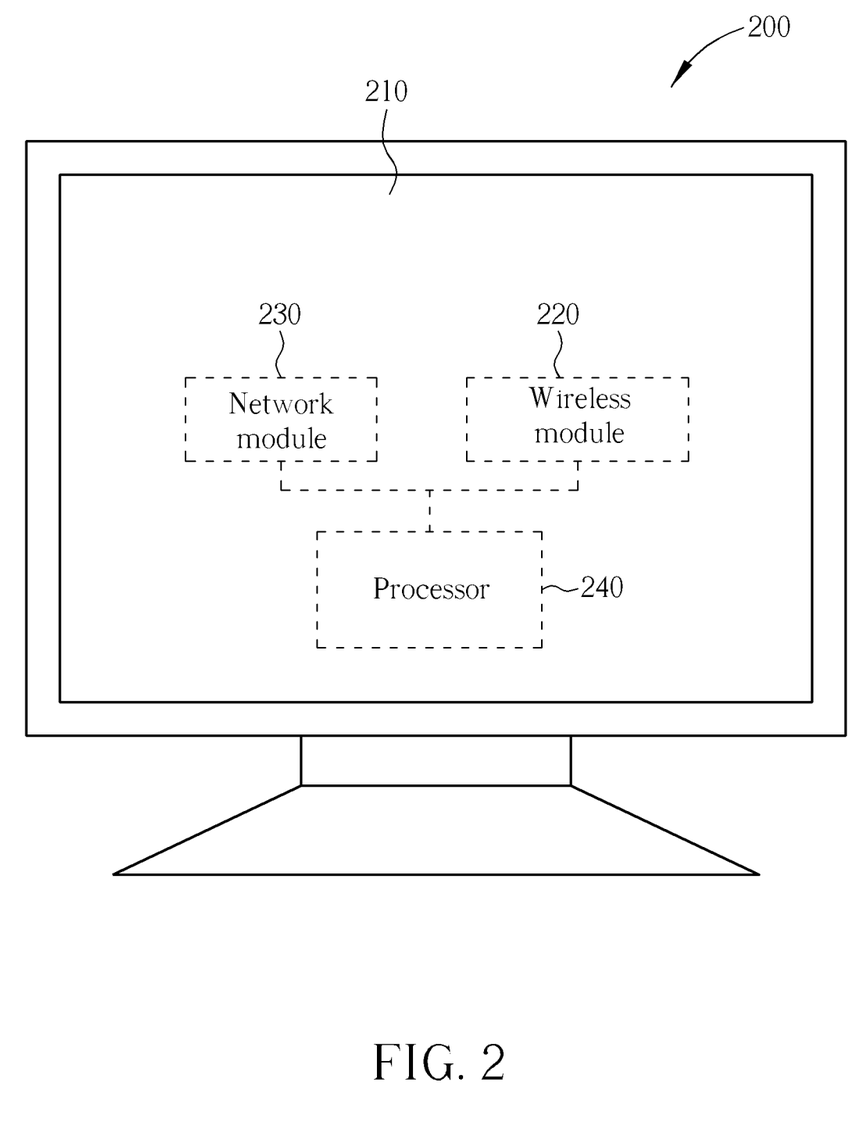
FIG. 2 is a diagram showing a display device 200 of the present invention.

Please refer to FIG. 2. FIG. 2 is a diagram showing a display device 200 of the present invention. The display device 200 of the present invention comprises a display panel 210, a network module 230, a wireless module 220, and a processor 240. The display panel 210 is utilized to display images. The network module 230 connects to the Internet. The wireless module 220 can be any wireless transmission module for receiving and transmitting wireless signals. The processor 240 is utilized to control operations of the display device 200 and executing Internet communication software. The display device 200 can be, but not limited to, a television or other types of display devices. In the present invention, the display device 200 is only required to have a screen size larger than the communication device 100. In addition, the display device 200 can also be a computer system with a wireless communication function for performing a method of the present invention.

Figure 3:
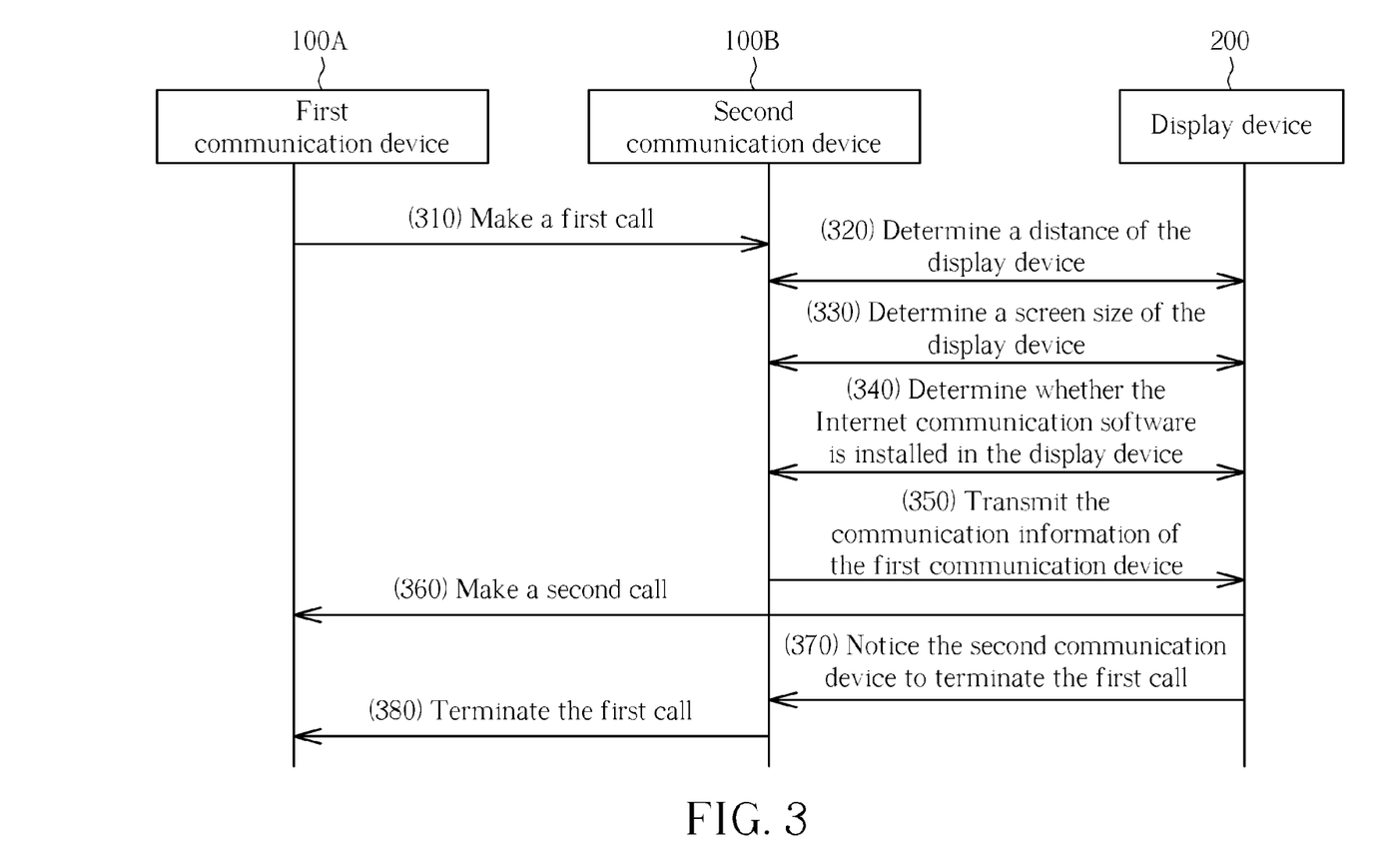
FIG. 3 is a diagram showing processes of a method for switching calls from a communication device to a display device of the present invention.

Please refer to FIG. 3, and refer to FIG. 1 and FIG. 2 as well. FIG. 3 is a sequence diagram showing the process for switching calls from a communication device to a display device according to the present invention. Firstly, in step 310, a first communication device 100A utilizes the communication module 110 to make a first call to a second communication device 100B via the mobile communication network. The first call can be a regular mobile phone call or an Internet call made by the Internet communication software. In step 320, the wireless module 120 of the second communication device 100B communicates with the wireless module 220 of the display device 200 for determining whether the display device 200 is within a predetermined distance from the second communication device 100B. For example, the second communication device 100B can utilize the wireless module 120 to send a wireless signal for requesting a response wireless signal transmitted by the wireless module 220 of the display device 200, and the second communication device 100B can further determine whether the display device 200 is within the predetermined distance from the second communication device 100B according to power of the response wireless signal, such as determining a distance between the second communication device 100B and the display device 200 according to a received signal strength indication (RSSI) level or a time of arrival (TOA) of the response wireless signal. If the display device 200 is within the predetermined distance from the second communication device 100B, then in step 330, the wireless module 120 of the second communication device 100B communicates with the wireless module 220 of the display device 200 for determining whether the screen size of the display panel 210 in the display device 200 is larger than a predetermined value. For example, the second communication device 100B can utilize the wireless module 120 to send a wireless signal to the display device 200 for inquiring the screen size of the display panel 210, the display device 200 can then utilize the wireless module 220 to send a wireless signal to the second communication device 100B for replying the screen size of the display panel 210, or the display device 200 can directly send a code indicating the screen size of the display panel 210 to the second communication device 100B. If the screen size of the display panel 210 in the display device 200 is larger than the predetermined value, then in step 340, the wireless module 120 of the second communication device 100B communicates with the wireless module 220 of the display device 200 for determining whether the Internet communication software is installed in the display device 200. If the Internet communication software is installed in the display device 200, then in step 350, the second communication device 100B utilizes the wireless module 120 to transmit communication information of the first communication device 100A to the display device 200, and commands the display device 200 to launch the Internet communication software. If the Internet communication software is not installed in the display device 200, the display device 200 can inform the second communication device 100B that it cannot launch the Internet communication software, or the display device 200 can inform the user to install the Internet communication software into the display device 200. In step 360, the display device 200 utilizes the Internet communication software to make a second call to the first communication device 100A according to the communication information of the first communication device 100A. The second communication device 100B can search for a corresponding network communication account of the first communication device 100A in the memory 130 according to a communication number of the first communication device 100A, and then transmit the network communication account of the first communication device 100A to the display device 200 for making the second call. In another embodiment of the present invention, the second communication device 100B can directly transmit the communication number of the first communication device 100A to the display device 200, and the display device 200 can then search for the network communication account corresponding to the communication number of the first communication device 100A with the Internet communication software in order to make the second call. In step 370, after the second call is established, the display device 200 notifies the second communication device 100B to terminate the first call. And in step 380, the second communication device 100B terminates the first call. The user then communicates with the first communication device 100A via the second call made by the display device 200.

The above second call can be a video call or any call with image or graphical message to be displayed. Since the screen size of the display panel 210 in the display device 200 is larger than the communication device 100, the user can see an image of the other call participant on the display device 200 more clearly.

Figure 4:
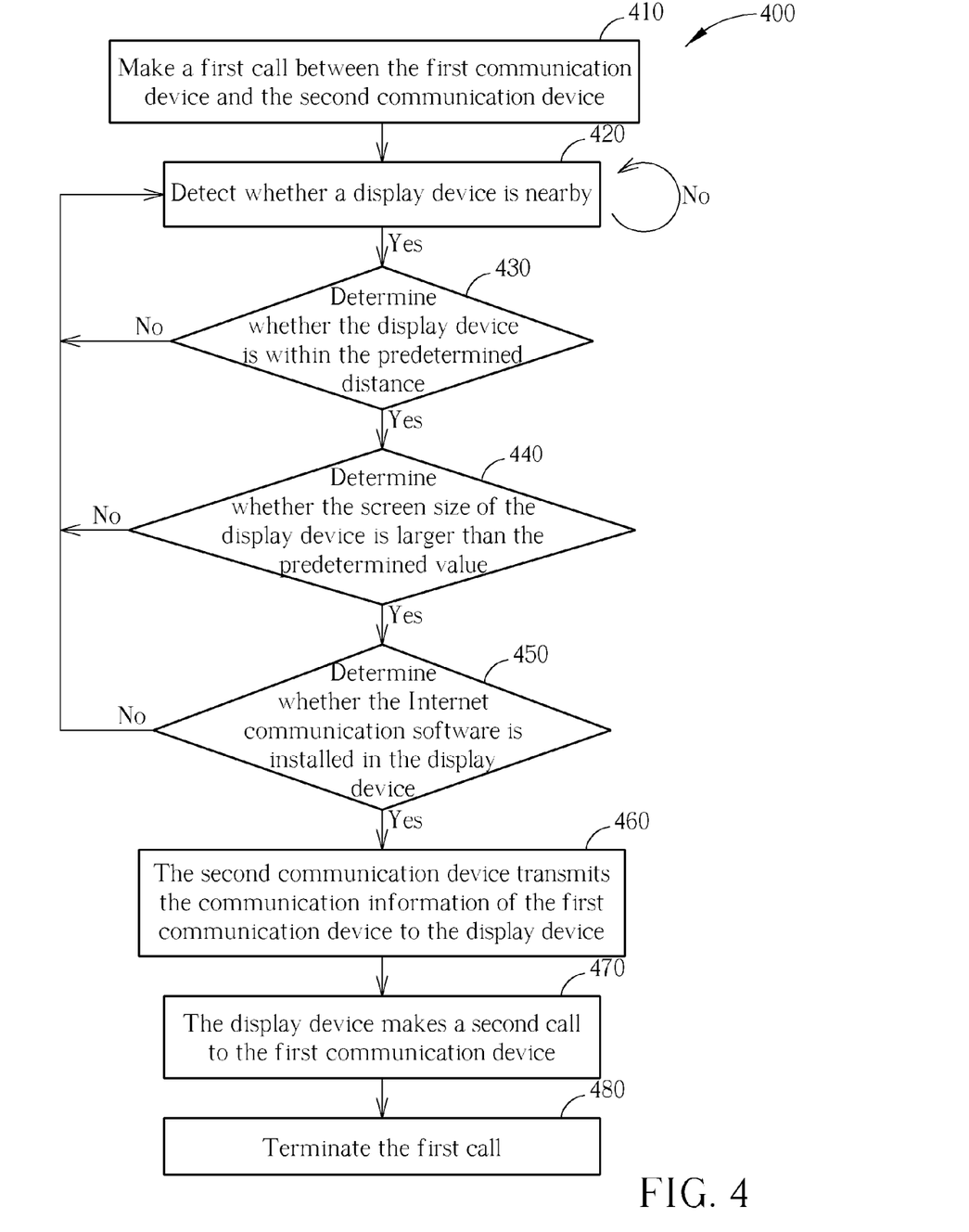
FIG. 4 is a flowchart showing a method for switching calls from the communication device to the display device of the present invention.

Please refer to FIG. 4. FIG. 4 is a flowchart 400 showing a method for switching calls from the communication device to the display device of the present invention. The method for switching calls from the communication device to the display device of the present invention comprises the following steps:

Step 410: Establish a first call between the first communication device 100A and the second communication device 100B;

Step 420: The second communication device 100B detects whether a display device is nearby; if yes, go to step 430; if not, repeat step 420;

Step 430: The second communication device 100B determines whether the display device 200 is within the predetermined distance; if yes, go to step 440; if not, go to step 420;

Step 440: The second communication device 100B determines whether the screen size of the display device 200 is larger than the predetermined value; if yes, go to step 450; if not, go to step 420;

Step 450: The second communication device 100B determines whether the Internet communication software is installed in the display device 200 (and whether the display device 200 comprises a webcam and a speaker); if yes, go to step 460; if not, go to step 420;

Step 460: The second communication device 100B transmits the communication information of the first communication device 100A to the display device 200;

Step 470: The display device 200 utilizes the Internet communication software to make a second call to the first communication device 100A according to the communication information of the first communication device 100A; and Step 480: Terminate the first call.

Basically, the same result can still be achieved if the steps of the method for switching calls are not in the same order as flowchart 400, or if other steps are inserted into the steps shown in the flowchart 400. In step 420, if the second communication device 100B detects no display device nearby, the second communication device 100B can continue the first call without searching for any display device nearby repeatedly.

Figure 5:
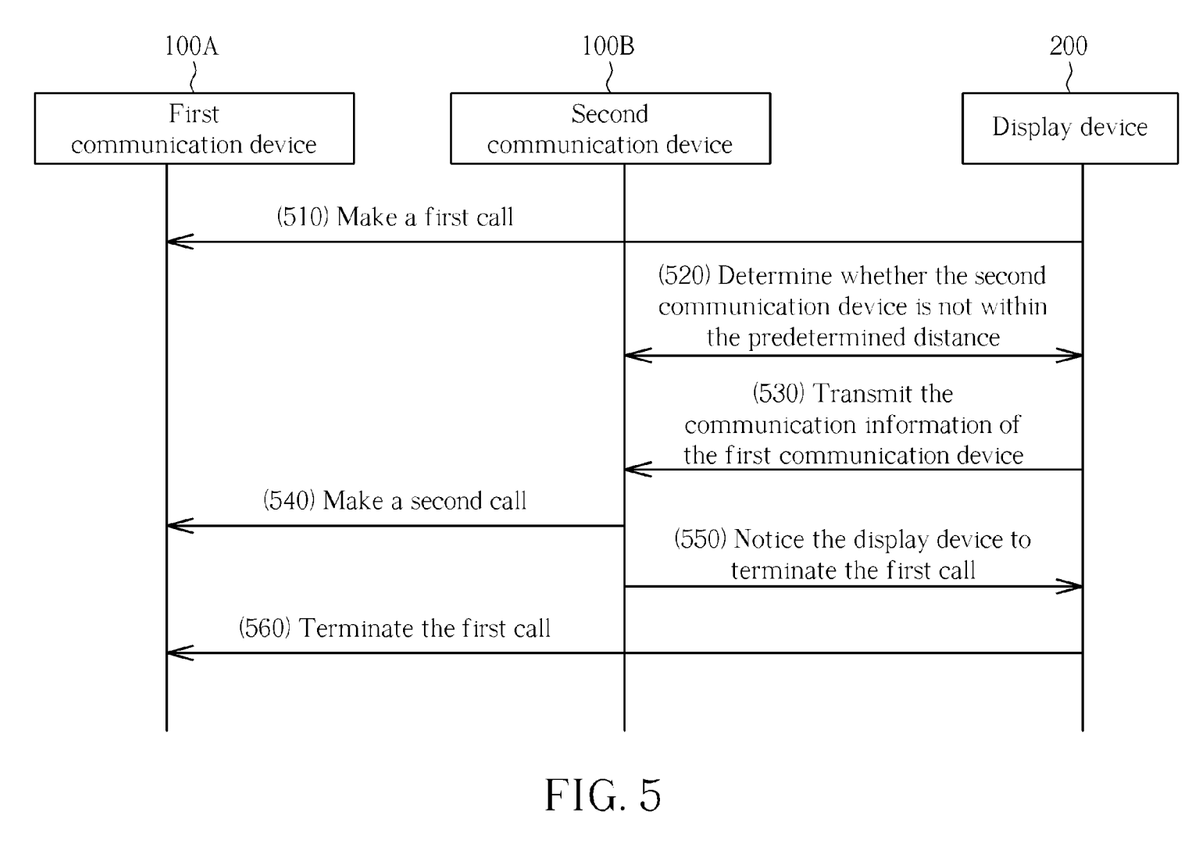
FIG. 5 is a diagram showing processes of a method for switching calls from the display device to the communication device of the present invention.

Please refer to FIG. 5, and refer to FIG. 1 and FIG. 2 as well. FIG. 5 is a sequence diagram showing the process of a method for switching calls from the display device to the communication device of the present invention. First in step 510, the display device 200 utilizes the network module 230 to make a first call to the first communication device 100a with the Internet communication software. In step 520, the wireless modules 220 of the display device 200 communicates with the wireless modules 120 of the second communication device 100B for determining whether the second communication device 100B is within the predetermined distance from display device 200. Similarly, the display device 200 can determine the distance between the second communication device 100B and the display device 200 according to a received signal strength indication (RSSI) level or a time of arrival (TOA) of a wireless signal transmitted by the second communication device 100B. If the distance between the second communication device 100B and the display device 200 is more than the predetermined distance, then the display device 200 utilizes the wireless module 220 to transmit the communication information of the first communication device 100A to the second communication device 100B in step 530. In step 540, the second communication device 100B utilizes the communication module 110 to make a second call to the first communication device 100A according to the communication information of the first communication device 100A. The display device 200 can search for the corresponding communication number of the first communication device 100A with the Internet communication software according to the network communication account of the first communication device 100A, and then transmit the communication number of the first communication device 100A to the second communication device 100B in order to make the second call. In another embodiment of the present invention, the display device 200 can directly transmit the network communication account of the first communication device 100A to the second communication device 100B, and the second communication device 100B can then search for the corresponding communication number of the first communication device 100A in the memory 130 according to the network communication account of the first communication device 100A in order to make the second call. The second communication device 100B can also utilize the preinstalled Internet communication software to make the second call directly according to the network communication account of the first communication device 100A. In step 550, the second communication device 100B notifies the display device 200 to terminate the first call when the second call is established. And in step 560, the display device 200 terminates the first call. The user then communicates with the first communication device 100A via the second call made by the second communication device 100B.

Figure 6:
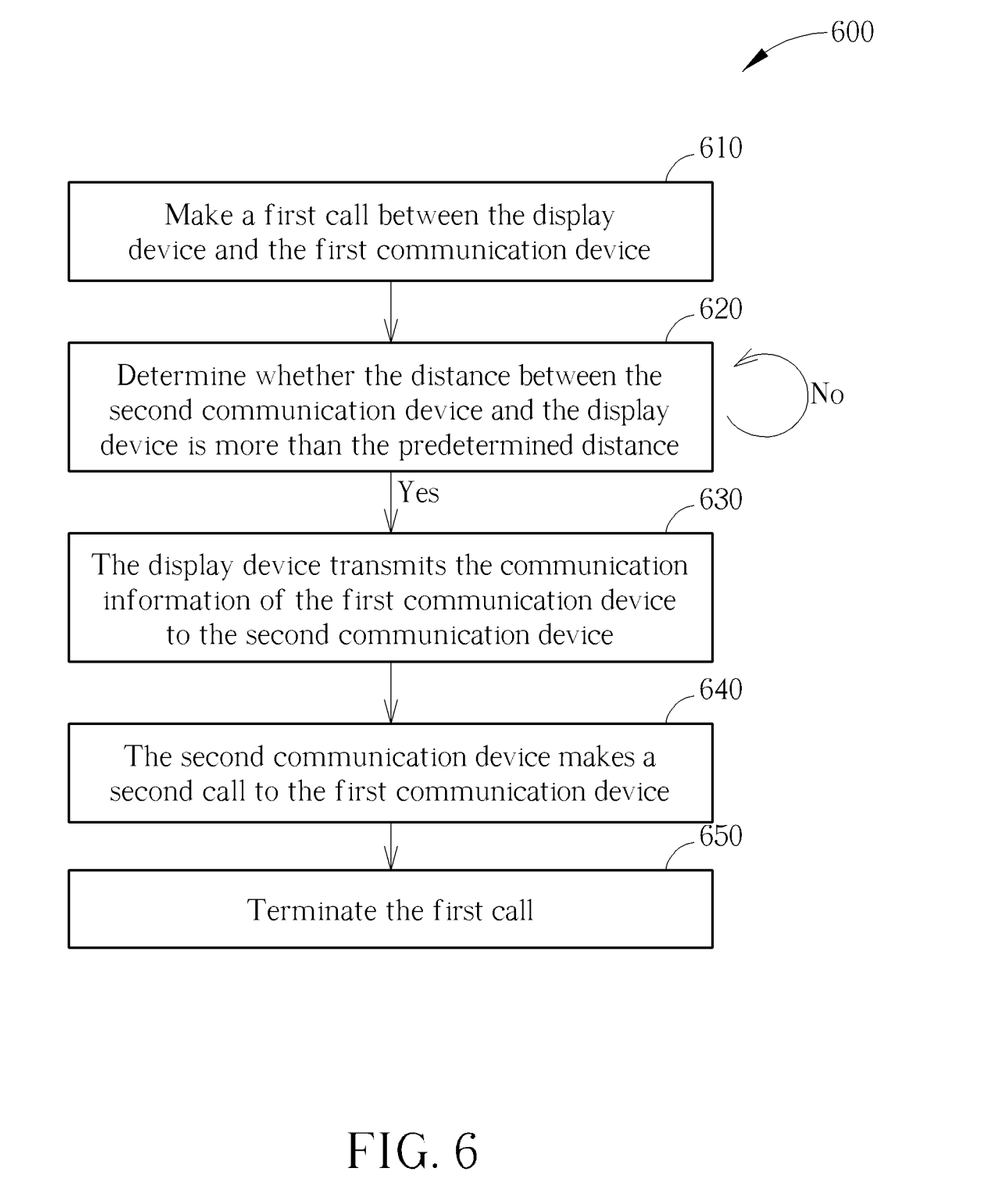
FIG. 6 is a flowchart showing a method for switching calls from the display device to the communication device of the present invention.

Please refer to FIG. 6. FIG. 6 is a flowchart 600 showing a method for switching calls from the display device to the communication device of the present invention. The method for switching calls from the display device to the communication device of the present invention comprises the following steps:

Step 610: Establish a first call between the display device 200 and the first communication device 100A;

Step 620: The display device 200 determines whether the distance between the second communication device 100B and the display device 200 is more than the predetermined distance; if yes, go to step 630; if not, repeat step 620;

Step 630: The display device 200 transmits the communication information of the first communication device 100A to the second communication device 100B;

Step 640: The second communication device 100B makes a second call to the first communication device 100A according to the communication information of the first communication device 100A; and Step 650: Terminate the first call.

Basically, the same result can still be achieved if the steps of the method for switching calls are not in the same order as flowchart 600, or if other steps are inserted into the steps shown in the flowchart 600.

Figure 7:
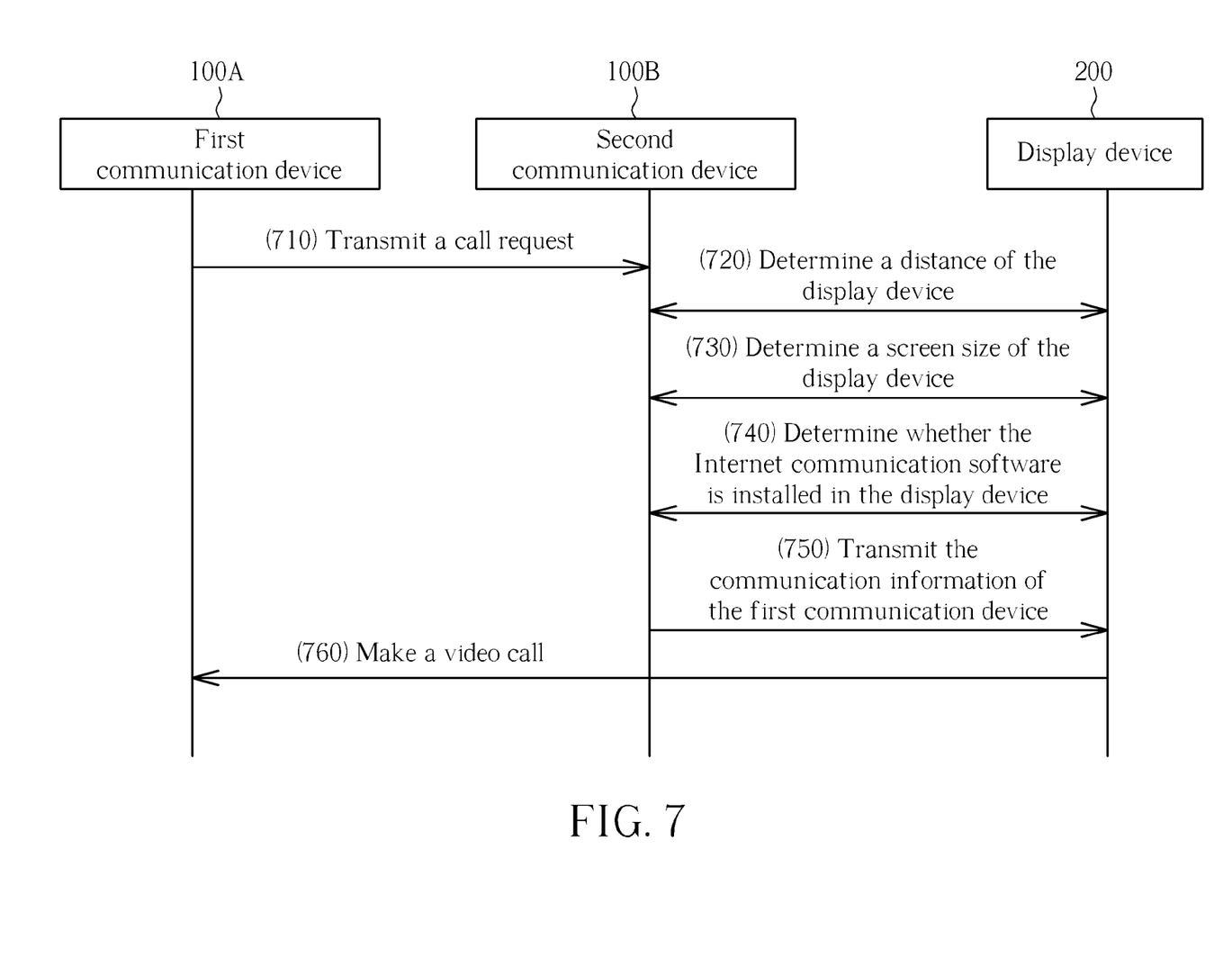
FIG. 7 is a diagram showing processes of another method for switching calls from the communication device to the display device of the present invention.

Please refer to FIG. 7, and refer to FIG. 1 and FIG. 2 as well. FIG. 7 is a sequence diagram showing the process of another method for switching calls from the communication device to the display device of the present invention. First in step 710, the first communication device 100A utilizes the communication module 110 to transmit a call request to a second communication device 100B via the mobile communication network. In step 720, before the second communication device 100B accepts the call request transmitted from the first communication device 100A, the wireless modules 120 of the second communication device 100B communicates with the wireless modules 220 the display device 200 for determining whether the display device 200 is within the predetermined distance from the second communication device 100B. For example, the second communication device 100B can utilize the wireless module 120 to send a wireless signal for requesting a response wireless signal transmitted by the wireless module 220 of the display device 200, and the second communication device 100B can further determine whether the display device 200 is within the predetermined distance from the second communication device 100B according to power of the response wireless signal, such as determining a distance between the second communication device 100B and the display device 200 according to a received signal strength indication (RSSI) level or a time of arrival (TOA) of the response wireless signal. If the display device 200 is within the predetermined distance from the second communication device 100B, the wireless modules 120 of the second communication device 100B communicates with the wireless modules 220 of the display device 200 for determining whether the screen size of the display panel 210 in the display device 200 is larger than a predetermined value in step 730. For example, the second communication device 100B can utilize the wireless module 120 to send a wireless signal to the display device 200 for inquiring the screen size of the display panel 210, and the display device 200 can then utilize the wireless module 220 to reply a wireless signal to the second communication device 100B indicating the screen size of the display panel 210. If the screen size of the display panel 210 in the display device 200 is larger than the predetermined value, the wireless modules 120 of the second communication device 100B communicates with the wireless modules 220 of the display device 200 for determining whether the Internet communication software is installed in the display device 200 in step 740. If the Internet communication software is installed in the display device 200, the second communication device 100B utilizes the wireless module 120 to transmit communication information of the first communication device 100A to the display device 200, and commands the display device 200 to launch the Internet communication software in step 750. In step 760, the display device 200 utilizes the Internet communication software to make a second call to the first communication device 100A according to the communication information of the first communication device 100A. The second communication device 100B can search for a corresponding network communication account of the first communication device 100A in the memory 130 according to a communication number of the first communication device 100A, and then transmit the network communication account of the first communication device 100A to the display device 200 in order to make a video call. In another embodiment of the present invention, the second communication device 100B can directly transmit the communication number of the first communication device 100A to the display device 200, and the display device 200 can then search for the network communication account corresponding to the first communication device 100A with the Internet communication software according to the communication number of the first communication device 100A.

In another embodiment of the present invention, it can be the communication device which requests for a call switches the call request to the display device in order to make the video call from the display device. For example, when the first communication device 100A is requested to make a call by the user, the first communication device 100A can then perform the steps 720 to 750 to command the display device 200 to launch the Internet communication software in order to make the video call to the second communication device 100B.

Figure 8:
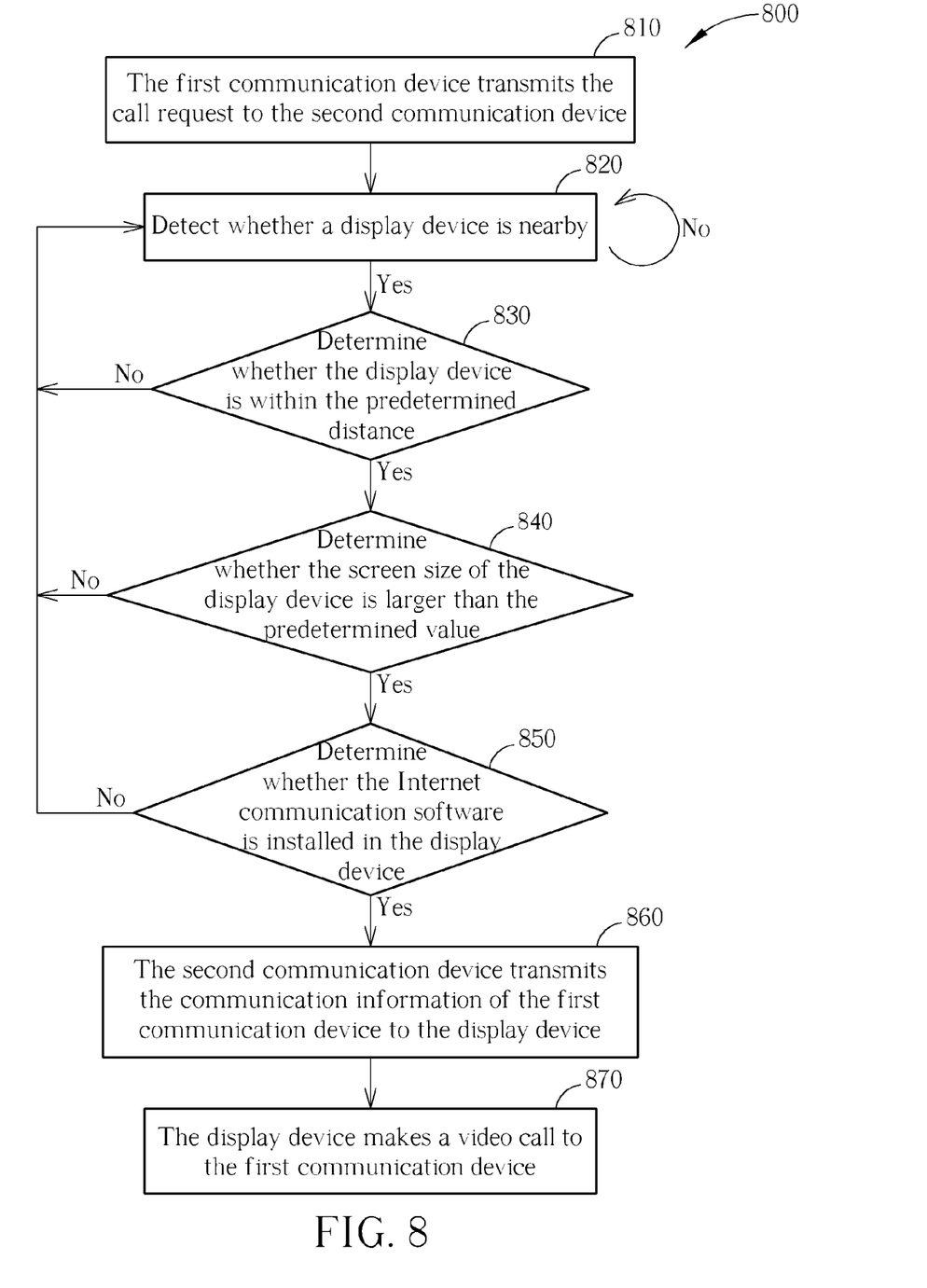
FIG. 8 is a flowchart showing another method for switching calls from the communication device to the display device of the present invention.

Please refer to FIG. 8. FIG. 8 is a flowchart 800 showing another method for switching calls from the communication device to the display device of the present invention. The flowchart of the method for switching calls from the communication device to the display device of the present invention comprises the following steps:

Step 810: The first communication device 100A transmits the call request to the second communication device 100B;

Step 820: The second communication device 100B detects whether a display device is nearby; if yes, go to step 830; if not, repeat step 820;

Step 830: The second communication device 100B determines whether the display device 200 is within the predetermined distance; if yes, go to step 840; if not, go to step 820;

Step 840: The second communication device 100B determines whether the screen size of the display device 200 is larger than the predetermined value; if yes, go to step 850; if not, go to step 820;

Step 850: The second communication device 100B determines whether the Internet communication software is installed in the display device 200 (and whether the display device 200 has or is connected to a webcam and a speaker); if yes, go to step 860; if not, go to step 820;

Step 860: The second communication device 100B transmits the communication information of the first communication device 100A to the display device 200;

Step 870: The display device 200 utilizes the internet communication software to make the video call to the first communication device 100A according to the communication information of the first communication device 100A.

Basically, the same result can still be achieved if the steps of the method for switching calls are not in the same order as flowchart 800, or other steps are inserted into the steps shown in the flowchart 800. In flowchart 800, it can be the second communication device 100B transmitting the call request to the first communication device 100A, the second communication device 100B is requested to make a call with the first communication device 100A by a user, at the step 810, and then the second communication device 100B performs the steps 820 to 870. Thus, the communication device requesting for the call can also switch the call to the display device nearby.

Figure 9:
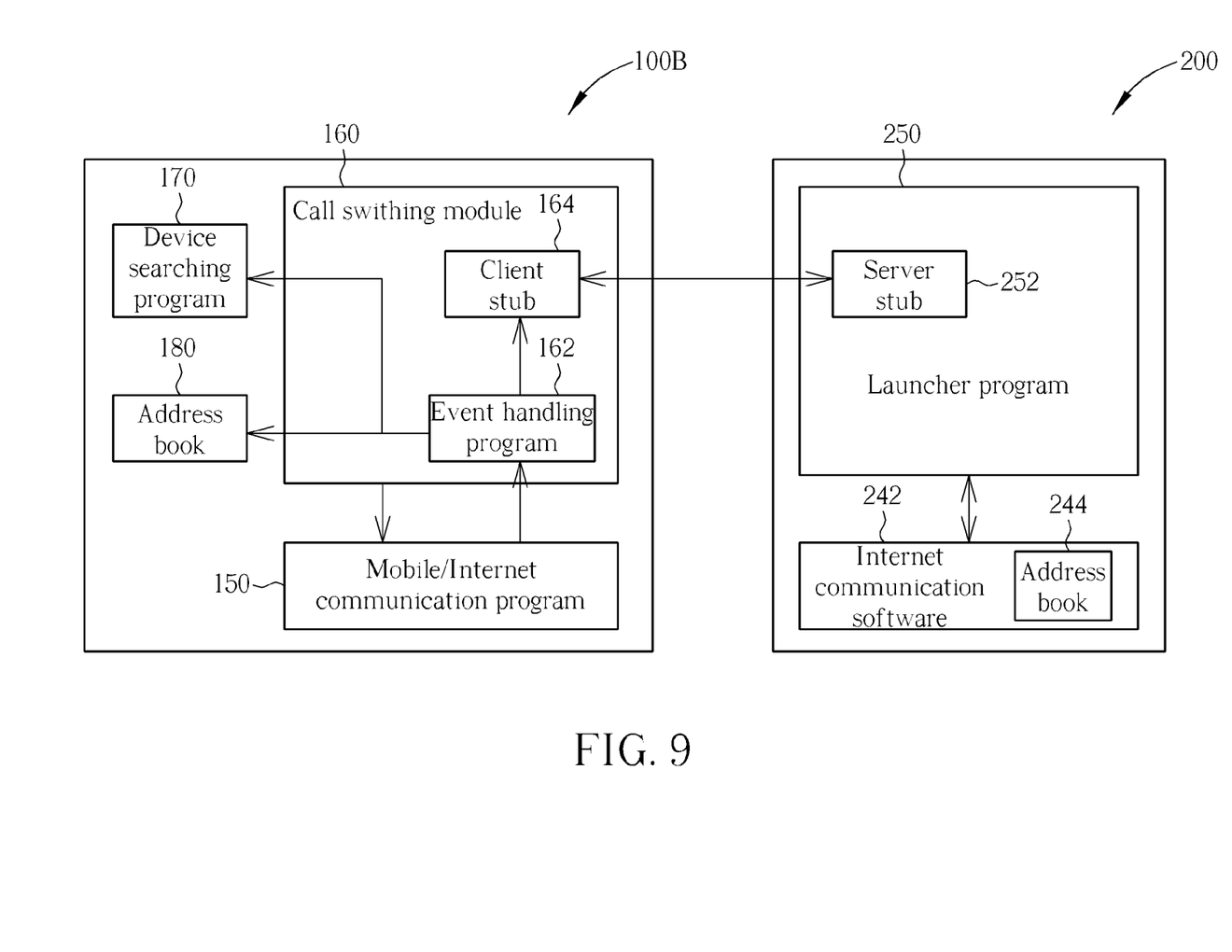
FIG. 9 is a diagram showing a software structure of the method for switching call from the communication device to the display device of the present invention.

Please refer to FIG. 9. FIG. 9 is a diagram showing the software architecture of the method for switching calls from the communication device to the display device according to the present invention. As shown in FIG. 9, the second communication device 100B utilizes a mobile/Internet communication program 150 to establish the first call with the first communication device 100A. After the first call is established, an event handling program 162 of a call switching module 160 in the second communication device 100B notifies a device searching program 170 to search for a nearby display device 200. After the display device 200 is found, client stub program 164 of the second communication device 100B communicates with server stub program 252 of the display device 200 for determining whether the display device 200 meets the requirement of making video calls. If the display device 200 meets the requirement, the event handling program 162 in the second communication device 100B searches for the network communication account of the first communication device 100A in the address book 180, and transmits the network communication account of the first communication device 100A to the display device 200. In another embodiment of the present invention, the event handling program 162 in the second communication device 100B can directly transmit the communication information of the first communication device 100A to the display device 200, and a launcher program 250 in the display device 200 then searches for the network communication account corresponding to the communication information of the first communication device 100A in an address book 244 of Internet communication software 242. Thereafter, the Internet communication software 242 of the display device 200 makes a second call to the first communication device 100A according to the network communication account of the first communication device 100A.

Figure 10:
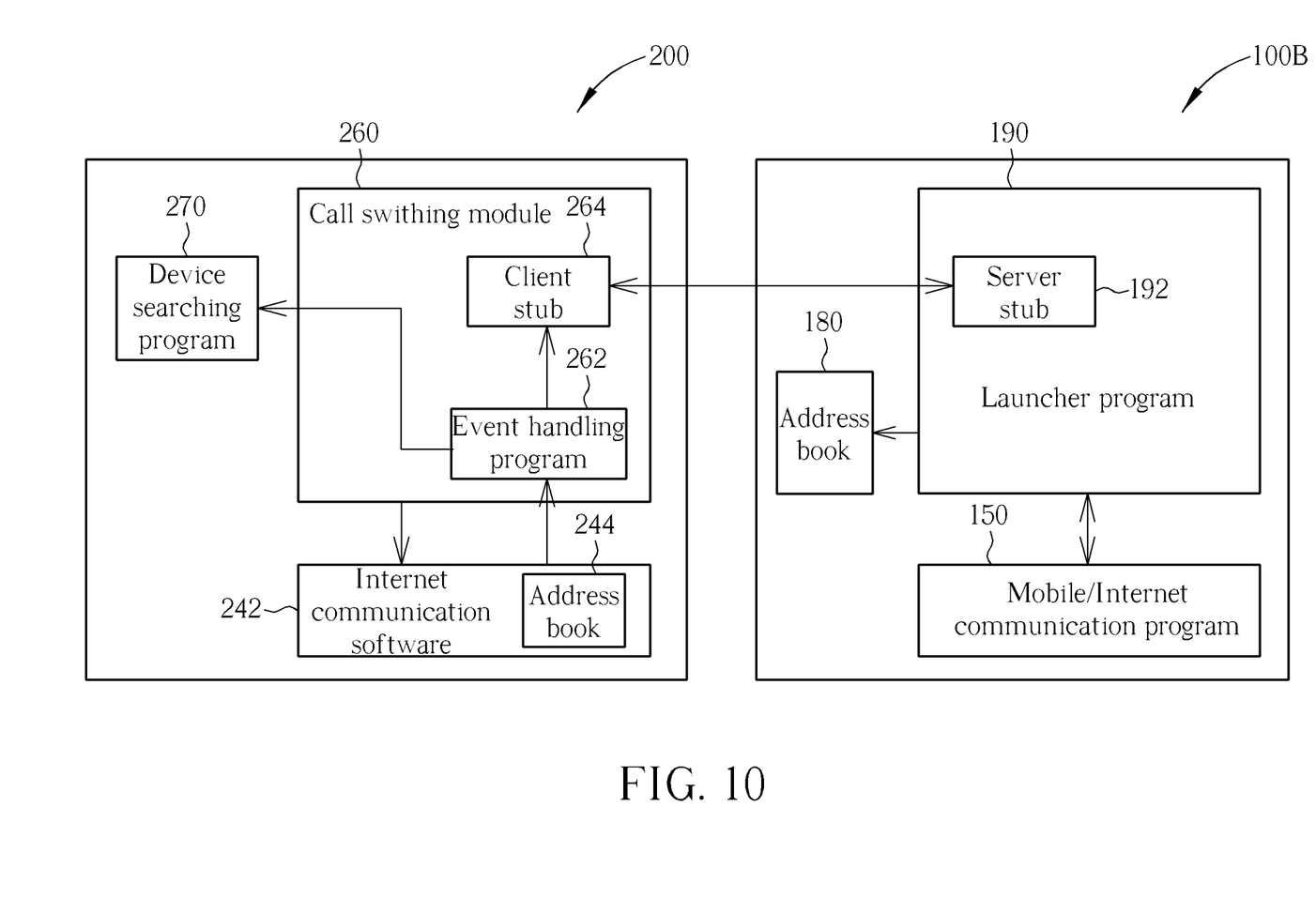
FIG. 10 is a diagram showing a software structure of the method for switching call from the display device to the communication device of the present invention.

Please refer to FIG. 10. FIG. 10 is a diagram showing the software architecture of the method for switching calls from the display device to the communication device according to the present invention. As shown in FIG. 10, the display device 200 utilizes the Internet communication software 242 to establish the first call with the first communication device 100A. After the first call is established, an event handling program 262 of a call switching module 260 in the display device 200 notifies a device searching program 270 to search for the second communication device 100B. After the second communication device 100B is found, client stub program 264 of the display device 200 communicates with server stub program 192 of the second communication device 100B for determining whether the second communication device 100B moves apart from the display device 200 by more than the predetermined distance. If the second communication device 100B moves apart from the display device 200 by more than the predetermined distance, the event handling program 262 of the display device 200 searches for the communication number of the first communication device 100A in the address book 244, and then transmits the communication number of the first communication device 100A to the second communication device 100B. In another embodiment of the present invention, the event handling program 262 of the display device can directly transmit the network communication account of the first communication device 100A to the second communication device 100B, and a launcher program 190 of the second communication device 100B then searches for the communication number corresponding to the network communication account of the first communication device 100A in the address book 180. Thereafter, the mobile/Internet communication program 150 of the second communication device 100B makes a second call to the first communication device 100A according to the communication number of the first communication device 100A.

In contrast to the prior art, the method for switching calls of the present invention can automatically switch a call to a display device with a larger screen size when a communication device receives an incoming call or establishes a call with another communication device. The method of the present invention can also automatically switch the call back to the communication device when the communication device moves apart from the display device. The present invention not only simplifies the operation steps of the user but also increase the convenience during use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for switching a call with video or at least one image between a first communication device and a display device, comprising:
   the first communication device determining whether the display device is within a predetermined distance from the first communication device;
   if the display device is within the predetermined distance from the first communication device, the first communication device obtaining functional information from the display device;
   the first communication device transmitting communication information corresponding to a second communication device to the display device only when the display device has a screen size larger than a screen size of the first communication device; and
   the display device launching network communication software and making a first call to the second communication device according to the communication information.

2. The method of claim 1, wherein the first communication device determines whether the display device is within the predetermined distance from the first communication device according to signal strength or arrival time of a received wireless signal emitted by the display device.

3. The method of claim 1, wherein the functional information indicates the screen size of the display device and whether the network communication software is installed in the display device.

4. The method of claim 1, further comprising the first communication device searching for a network communication account corresponding to the second communication device, wherein the communication information corresponding to the second communication device comprises the network communication account corresponding to the second communication device.

5. The method of claim 1 further comprising the display device searching for a network communication account corresponding to the second communication device according to the communication information corresponding to the second communication device, wherein the communication information comprises a communication number corresponding to the second communication device.

6. The method of claim 1 further comprising the first communication device being requested to make a second call to the second communication device before the step of determining whether a display device is within a predetermined distance from the first communication device.

7. The method of claim 1 further comprising the first communication device receiving a call request from the second communication device before the step of determining whether a display device is within a predetermined distance from the first communication device.

8. The method of claim 1 further comprising the display device notifying the first communication device to terminate a second call between the first communication device and the second communication device after the first call is established.

9. A method for switching a call with video or at least one image between a display device and a first communication device, comprising:
   the first communication device determining whether the display device is within a predetermined distance from the first communication device;
   when the display device is within the predetermined distance from the first communication device, the first communication device transmitting communication information corresponding to a second communication device to the display device;
   utilizing network communication software installed in the display device to establish a first call to a second communication device;
   the display device determining whether distance to the first communication device is more than a predetermined distance after the first call is established; and
   when the distance to the first communication device is more than the predetermined distance, the display device transmitting communication information corresponding to the second communication device to the first communication device, the first communication device making a second call to the second communication device according to the communication information, and the display device terminating the first call.

10. The method of claim 9, wherein the display device determines the distance to the first communication device according to signal strength or arrival time of a wireless signal emitted by the first communication device.

11. The method of claim 9 further comprising the first communication device searching for a communication number corresponding to the second communication device according to the communication information corresponding to the second communication device.

12. The method of claim 9 further comprising the display device searching for a communication number corresponding to the second communication device, wherein the communication information corresponding to the second communication device comprises the communication number corresponding to the second communication device.

13. A method, implemented in a display device having a wireless module and a processor, for automatically making calls, said method comprising:
   receiving a first wireless signal transmitted from a first communication device, said first wireless signal requesting a response signal from the display device;
   generating a response wireless signal responding to the first wireless signal and transmitting the response wireless signal to the first communication device;
   receiving a second wireless signal from the first communication device, said second wireless signal requesting functional information of the display device;
   generating and transmitting a third wireless signal to the first communication device, said third wireless signal indicating functional information of the display device; and
   receiving communication information corresponding to a second communication device from the first communication device only when the display device has a screen size larger than a screen size of the first communication device; and
   launching network communication software and transmitting a call request to the second communication device according to the communication information.

14. The method of claim 13, wherein said response wireless signal indicates whether the display device is within a predetermined distance from the first communication device when said response wireless signal is received by the first communication device.

15. The method of claim 13, wherein the functional information indicates the screen size of the display device and whether the network communication software is installed in the display device.

16. The method of claim 13, wherein the communication information corresponding to the second communication device comprises a network communication account corresponding to the second communication device, and the display device utilizes the network communication software to send the call request to the network communication account.

17. The method of claim 13, further comprising searching for a network communication account corresponding to the second communication device according to the communication information corresponding to the second communication device received from the first communication device.

18. The method of claim 13 further comprising:
   determining whether the distance to the first communication device is more than a predetermined distance;
   if distance to the first communication device is more than the predetermined distance, transmitting the communication information corresponding to the second communication device to the first communication device; and
   terminating the first call.

19. The method of claim 18, wherein the distance to the first communication device is determined according to signal strength or arrival time of a fourth wireless signal emitted by the first communication device.

20. The method of claim 18, further comprising receiving a fifth wireless signal from the first communication device requesting to terminate the first call before terminating the first call.

* * * * *